United States Patent
Stork et al.

(10) Patent No.: US 8,280,887 B1
(45) Date of Patent: Oct. 2, 2012

(54) HIERARCHICAL CLUSTERING USING CORRELATION METRIC AND SPATIAL CONTINUITY CONSTRAINT

(75) Inventors: Christopher L. Stork, Albuquerque, NM (US); Luke N. Brewer, Marina, CA (US)

(73) Assignee: Sandia Corporation, Albuquerque, NM (US)

(*) Notice: Subject to any disclaimer, the term of this patent is extended or adjusted under 35 U.S.C. 154(b) by 102 days.

(21) Appl. No.: 13/042,053

(22) Filed: Mar. 7, 2011

(51) Int. Cl.
*G06F 17/00* (2006.01)

(52) U.S. Cl. .................... 707/737; 707/722

(58) Field of Classification Search ............. None
See application file for complete search history.

(56) References Cited

U.S. PATENT DOCUMENTS

2011/0129015 A1* 6/2011 Nguyen et al. ......... 375/240.16

OTHER PUBLICATIONS

Baek, Seongjoon et al., "A Fast Encoding Algorithm for Vector Quantization," IEEE Signal Processing Letters, Dec. 1997, vol. 4, No. 12, pp. 325-327.
Anderberg, Michael R., "Cluster Analysis for Applications," 1973, pp. 145-146, Academic Press, Inc., New York, New York.
Day, William H. E., "Efficient Algorithms for Agglomerative Hierarchical Clustering Methods," Journal of Classification, 1984, vol. 1, No. 1, pp. 7-24.
Cluster analysis, Wikipedia, retrieved from Internet on Feb. 7, 2011, <http://en.wikipeida.org/wiki/Cluster_analysis>, 13 pages.
Principal component analysis, Wikipedia, retrieved from Internet on Feb. 7, 2011, <http://en.wikipedia.org/wiki/Principal_component_analysis>, 13 pages.
Hyperspectral imaging, Wikipedia, retrieved from Internet on Feb. 7, 2011, <http://en.wikipedia.org/wiki/Hyperspectral_imaging>, 5 pages.

* cited by examiner

*Primary Examiner* — Belix M Ortiz Ditren
(74) *Attorney, Agent, or Firm* — Scott B. Stahl

(57) ABSTRACT

Large data sets are analyzed by hierarchical clustering using correlation as a similarity measure. This provides results that are superior to those obtained using a Euclidean distance similarity measure. A spatial continuity constraint may be applied in hierarchical clustering analysis of images.

17 Claims, 4 Drawing Sheets

| Cluster | Nearest Neighbor | Proximity Measure |
|---|---|---|
| Cluster vector/sample vector ID | Cluster vector/sample vector ID | Correlation value |
| ⋮ | ⋮ | ⋮ |
| ⋮ | ⋮ | ⋮ |
| ⋮ | ⋮ | ⋮ |

US 8,280,887 B1

HIERARCHICAL CLUSTERING USING CORRELATION METRIC AND SPATIAL CONTINUITY CONSTRAINT

This invention was developed under Contract DE-AC04-94AL85000 between Sandia Corporation and the U.S. Department of Energy. The U.S. Government has certain rights in this invention.

CROSS-REFERENCE TO RELATED APPLICATION

This application contains subject matter related to subject matter contained in U.S. application Ser. No. 12/636,898, filed on Dec. 14, 2009 and incorporated herein by reference.

FIELD

The present work relates generally to data analysis and, more particularly, to hierarchical clustering for analysis of large data sets.

BACKGROUND

Hierarchical clustering is an important tool for understanding the relationships (e.g., similarities and differences) between samples in a dataset, and is routinely used in the analysis of relatively small datasets (e.g., when the number of samples is less than 200). Hierarchical clustering organizes a set of samples into a hierarchy of clusters, based on the distances of the clusters from one another in the variable or measurement space. This hierarchy is represented in the form of a tree or dendrogram.

FIG. 1A illustrates a dataset 100 composed of six samples A-F where each sample is characterized by two variables or dimensions X and Y. The samples A-F have been plotted in the two-dimensional variable space 105. In other words, the plotted position of each sample A-F within space 105 is representative of that sample's measured values for the variables X and Y. FIG. 1B illustrates a dendrogram 110 with the individual samples A-F at one end, such that each sample forms its own cluster (LEVEL 0), and a single cluster C5 containing every sample at the other end (LEVEL 5). Each successive level of dendrogram 110 illustrates the relative proximity of clusters formed from samples A-F within space 105 using Euclidian distance as measured using the vector space X and Y. At LEVEL 0 each sample forms its own cluster, at LEVEL 1 the two closest samples are clustered together (i.e., samples 13 and C in cluster C1). Dendrogram 110 continues until all samples A-F are grouped into the single cluster C5.

Hierarchical clustering, however, is typically not applied to hyperspectral images or other large data sets due to computational and computer storage limitations. Hyperspectral image sets are characterized by a large number of samples or pixels (for example, typically greater than 10,000) and a large number of variables or spectral channels (for example greater than 100). Conventional hierarchical clustering techniques require the calculation and updating of a pair wise cluster dissimilarity matrix. The cluster dissimilarity matrix stores the distance between each pair of clusters comprising a data set, and can be used to facilitate hierarchical clustering.

A problem arises, however, in calculating and storing the cluster dissimilarity matrix for a large data set. As a case in point, for a hyperspectral image set composed of 10,000 pixels, the corresponding cluster dissimilarity matrix would initially be of dimensions 10,000 by 10,000, resulting in out-of-memory errors on a standard desktop computer. For datasets where the number of samples ranges from approximately 2,000 to 8,000, conventional hierarchical clustering techniques require anywhere from several hours to days to complete the desired dendrogram, due to the high computational overhead in calculating and updating the cluster dissimilarity matrix.

It is desirable in view of the foregoing to provide for improvements in analysis of large data sets with hierarchical clustering.

DETAILED DESCRIPTION

Figure 1A:
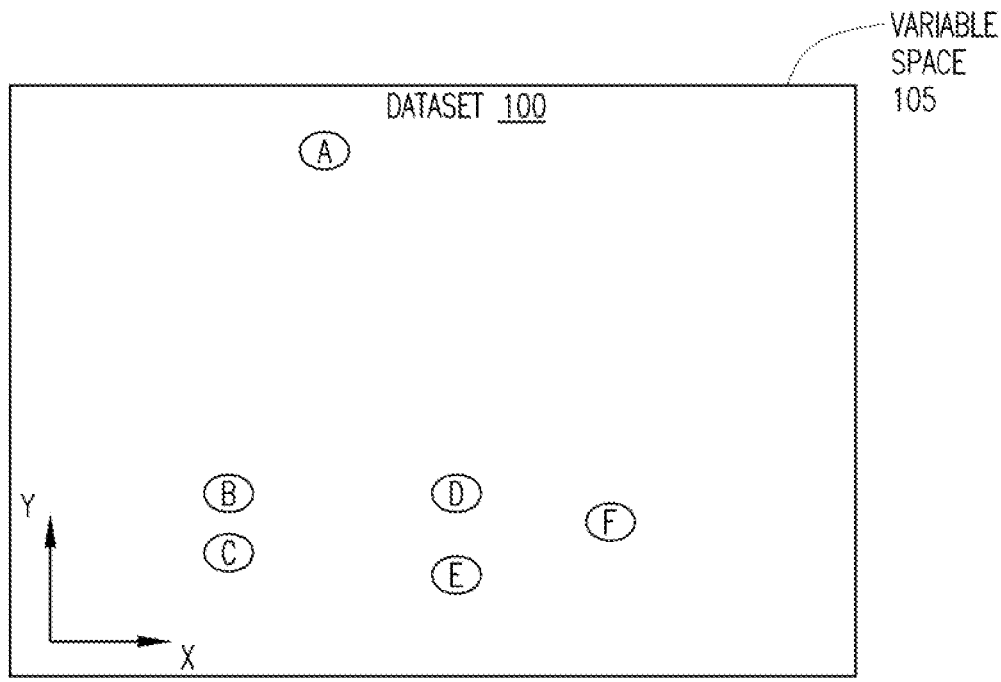
FIG. 1A graphically illustrates an example of a data set to which techniques according to the present work may be applied.
Figure 1B:
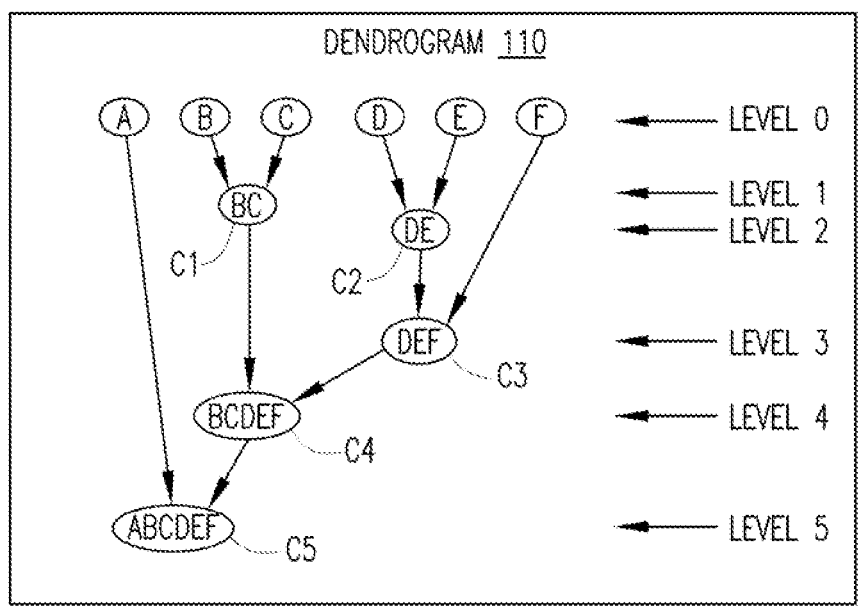
FIG. 1B graphically illustrates an example of a dendrogram that may be produced by hierarchical clustering analysis of the data set of FIG. 1A.

One example application for hierarchical clustering techniques is electron backscattered diffraction (EBSD), which is commonly utilized for mapping the crystallography on the surface of a sample material. The output of an EBSD sample analysis is a value for the best matched phase and its corresponding orientation at each spatial location in the map. For each acquired diffraction pattern, the best matched phase is determined by comparing sets of interplanar angles measured from that indexed pattern with tables of interplanar angles for a library of proposed crystallographic phases. The conventional approach of directly indexing the acquired EBSD patterns is problematic due to the low signal-to-noise ratio in any given individual pattern. In addition, failure to choose all of the correct phases a priori in the matching process will result in mapping errors. Moreover, a great deal of measurement time is spent attempting to crystallographically index each diffraction pattern individually, even when many patterns are nearly identical.

Hierarchical clustering has been used in the analysis of relatively small EBSD data sets, e.g., when the number of samples is less than 1000. (See G. Barr et al, "High-throughput powder diffraction. II. Applications of clustering methods and multivariate data analysis", Journal of Applied Crystallography, 37, 243-252, 2004). However, hierarchical clustering has not typically been applied to larger data sets (e.g., 1,000 or more samples) due to computational and computer storage limitations such as described above.

To improve upon the conventional approach of pattern indexing and phase identification, fast and computationally efficient hierarchical clustering techniques have been developed for extracting component patterns and phase information from EBSD data. Examples of such techniques are described in pending U.S. patent application Ser. No. 12/636, 898, filed by the applicant of the present application on Dec. 14, 2009, and entitled "Technique for Fast and Efficient Hierarchical Clustering". U.S. application Ser. No. 12/636,898, which is incorporated by reference herein, describes hierarchical clustering techniques applicable to data sets encompassing thousands or even tens of thousands of samples. Instead of using the conventional cluster dissimilarity matrix, the techniques described in U.S. application Ser. No. 12/636, 898 use a nearest neighbor approach for clustering, and implement a Euclidean distance criterion as a similarity measure (also referred to herein variously as a similarity or proximity criterion or metric) for assembling and updating a nearest neighbor matrix.

Hierarchical clustering according to exemplary embodiments of the present work uses the aforementioned nearest neighbor approach, but implements a correlation coefficient as the similarity criterion for the nearest neighbor matrix. Such a correlation similarity measure has been observed to provide EBSD data analysis results that are superior to those obtained using the Euclidean distance similarity measure. For example, a correlation coefficient criterion is less sensitive than the Euclidean distance criterion to changes in diffraction pattern magnitude. As a case in point, pixels associated with the same underlying diffraction pattern but with different magnitude variations are incorrectly merged into different clusters using the Euclidean distance measure, but are correctly merged into the same cluster using a correlation measure.

A correlation coefficient similarity measure has been implemented to facilitate extracting a small set of EBSD patterns from a large collection (potentially thousands) of acquired EBSD patterns. The extracted set of EBSD patterns exhibits a higher signal-to-noise characteristic than does the larger collection of acquired patterns. The extracted set may be subsequently indexed according to conventional techniques. In some instances, a correlation coefficient similarity measure successfully extracts valuable spatial distribution and diffraction pattern information for the phases within a sample, even when library diffraction profiles of these phases are unavailable.

Data processing operations used for analysis of a raw data set according to exemplary embodiments of the present work are now described. Some embodiments use conventional principal component analysis (PCA) to filter noise from a collection of raw data. In the following description of PCA, column vectors are denoted by boldface lowercase letters, row vectors are represented as transposed column vectors, with transposition symbolized by the superscript T, e.g., $x^T$, and matrices are represented by boldface uppercase letters. Consider a matrix X (m rows by n columns) that contains m samples of raw data, where each sample is defined by a sample vector of n variables. As is known in the art, for a matrix X of chemical rank k, with $k \leq \min\{m,n\}$, PCA decomposes X into a set of k rank 1 matrices, arranged in order of decreasing eigenvalue, plus a residual matrix E, corresponding to noise or other irrelevant sources of variance:

$$X = t_1 p_1^T + t_2 p_2^T + \ldots + t_k p_k^T + E = T_k P_k^T + E.$$

The score vector, $t_i$, can be interpreted as the samples' coordinates for principal component i as defined by the new basis or loading vector, $P_i$. The desired noise filtered version, $\hat{X}$, of the raw data matrix X is achieved by retaining the first k principal components:

$$\hat{X} = T_k P_k^T.$$

Some embodiments apply hierarchical clustering to the sample vectors of the noise filtered data matrix $\hat{X}$. An example of hierarchical clustering operations according to exemplary embodiments is described with reference to FIG. 2. To support the clustering process, a nearest neighbor and associated nearest neighbor correlation value are determined for each sample vector, as shown at 21. The process of determining the nearest neighbor and nearest neighbor correlation value includes calculating and storing in memory a mean value and a standard deviation value for each sample vector within $\hat{X}$. For a given sample vector, a correlation value is calculated between that sample vector and each of the other m-1 sample vectors, and these m-1 correlation values are stored in memory. As an example, the correlation value $c_{1,2}$ between first and second sample vectors $\hat{x}_1$ and $\hat{x}_2$, is calculated using the following equation:

$$c_{1,2} = (\hat{x}_1 - v_1)^T (\hat{x}_2 - v_2) / ((n-1) s_1 s_2)$$

where $v_1$ is the mean value of the sample vector $\hat{x}_1$, $s_1$ is the standard deviation of the sample vector $\hat{x}_1$, $v_2$ is the mean value of the sample vector $\hat{x}_2$, and $s_2$ is the standard deviation of the sample vector $\hat{x}_2$.

The m-1 correlation values calculated between the given sample vector and the other m-1 sample vectors are compared, and the largest of the correlation values is determined. The sample vector corresponding to the largest correlation value is judged to be the nearest neighbor to the given sample vector.

For each of the other m-1 sample vectors, the nearest neighbor sample vector and its corresponding correlation value are determined in the manner described above. The nearest neighbor sample vectors and corresponding correlation values, as determined for the m sample vectors, may be used to populate a nearest neighbor matrix or table (or other suitable data structure). This table identifies, for each sample vector, the nearest neighbor of that sample vector, and the correlation value corresponding to the nearest neighbor. The operation of populating the nearest neighbor table is shown at 22 in FIG. 2.

Figure 2:
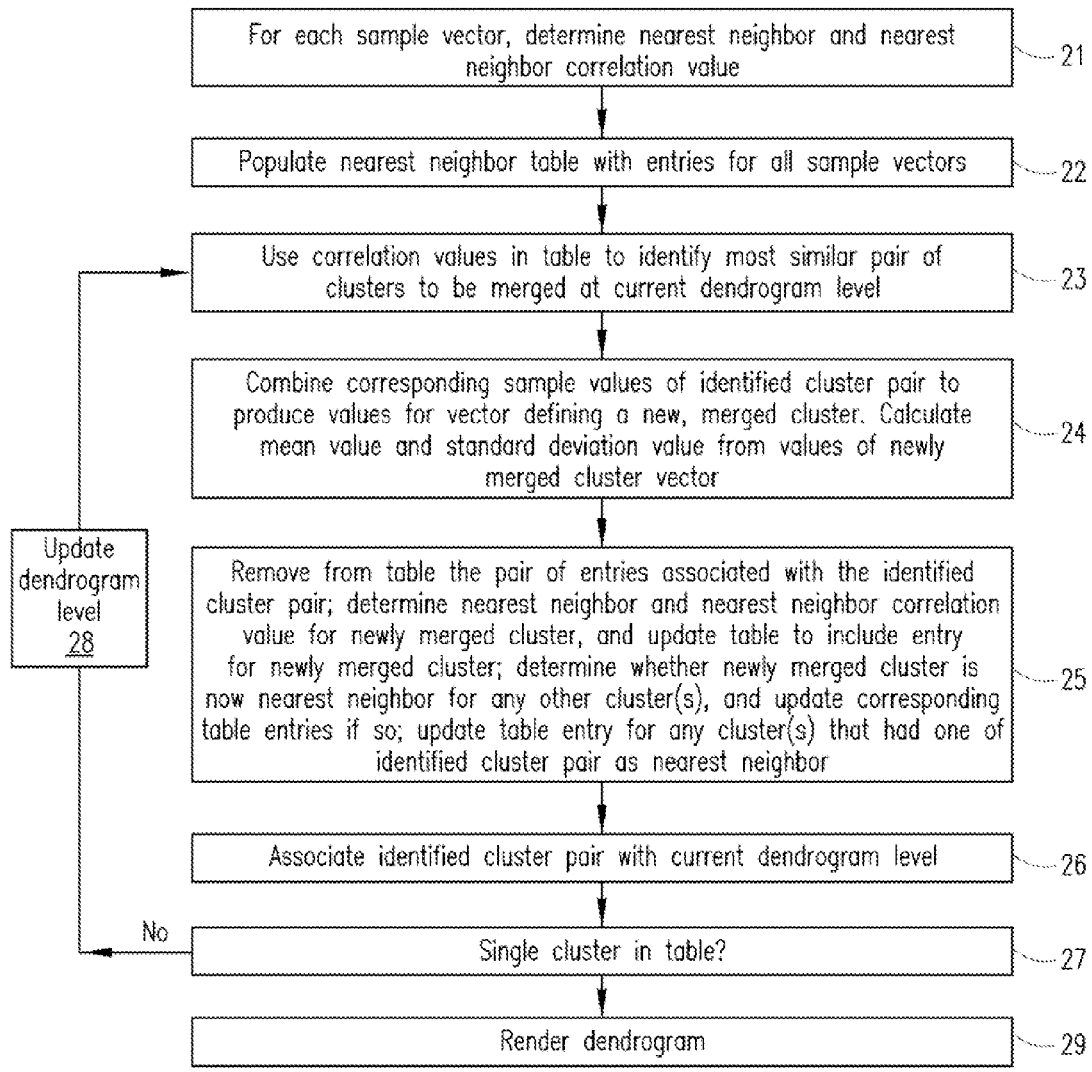
FIG. 2 illustrates operations that may be performed according to exemplary embodiments of the present work.

With the nearest neighbor table populated, some embodiments perform the iterative hierarchical clustering operations shown at 23-29 in FIG. 2. Note that the term "cluster" may also be applied to the sample vectors of the nearest neighbor table, that is, each sample vector may itself be considered to constitute a "cluster" for purposes of describing the iterative hierarchical clustering operations. The most similar pair of clusters in the nearest neighbor table is identified at 23, for example, by determining which entry of the table has the largest correlation value. The clusters of the identified pair are then merged at 24, for example, by combining corresponding values from the sample vectors of the cluster pair to produce an n-dimensional vector of values for the merged cluster. In some embodiments, each value of the vector for the merged cluster is produced by determining the mean or average of each pair of corresponding sample values from the respective n-dimensional sample vectors of the identified cluster pair. The mean and standard deviation of the merged cluster vector are also calculated, as shown at 24.

At 25, the pair of entries associated with the identified pair of clusters (the pair that have been merged) are removed from the nearest neighbor table, the nearest neighbor and nearest neighbor correlation value are determined for the newly merged cluster, and the nearest neighbor table is updated by inserting an entry for the newly merged cluster. It is also determined at 25 whether the newly merged cluster is now the nearest neighbor for any other cluster(s) and, if so, the corresponding table entries are updated accordingly. Also at 25, the table entry for any cluster(s) that had one of the identified cluster pair as its nearest neighbor is updated with a newly determined nearest neighbor and corresponding correlation value.

At 26, the cluster pair identified at 23 and merged at 24 is associated with a current level of the dendrogram (cluster tree) that is being constructed by the hierarchical clustering operations. For example, the identified cluster pair may be recorded in a suitable data structure that represents the dendrogram. As shown generally at 23-28, the cluster pair identification, cluster pair merging and nearest neighbor table updating are iteratively repeated until all original sample vectors have been merged through a plurality of dendrogram levels into a single cluster. When only a single cluster remains in the nearest neighbor table, the dendrogram may then be rendered, as shown at 29.

As used herein, the term "cluster vector" refers to an n-dimensional vector that has been produced by combining values (such as described above) from two n-dimensional vectors during the merging of those two vectors, where: the two merged vectors may both be sample vectors; or the two merged vectors may both be cluster vectors; or the two merged vectors may comprise one sample vector and one cluster vector.

Figures 3, 4:
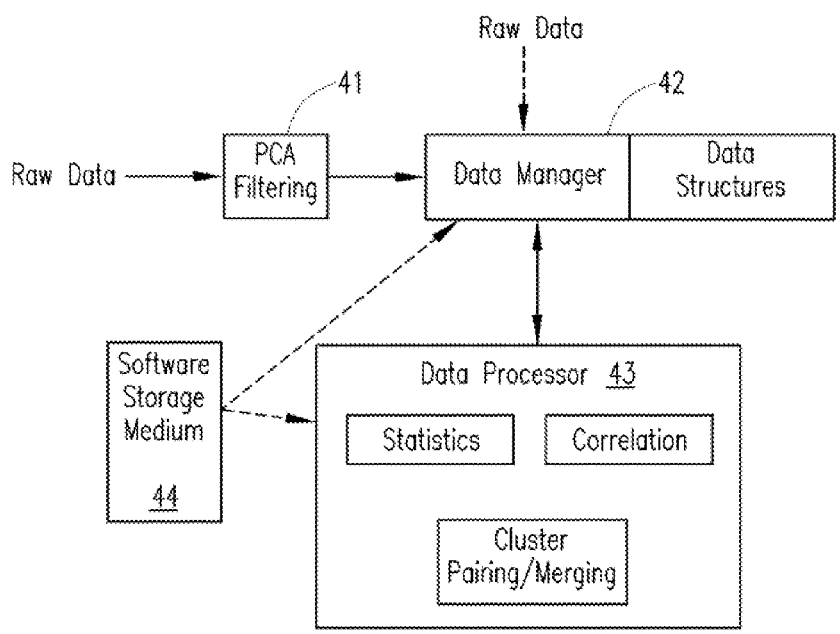
FIG. 3 illustrates a nearest neighbor table according to exemplary embodiments of the present work.
FIG. 4 diagrammatically illustrates an apparatus for performing hierarchical clustering according to exemplary embodiments of the present work.

FIG. 3 illustrates an example of a nearest neighbor table according to exemplary embodiments of the present work. As explained above, all entries of the table initially correspond to sample vectors. However, inasmuch as the table is revised repeatedly as the clustering operation iterates, FIG. 3 reflects that the table will nearly always contain entries for both sample vectors and cluster vectors at any given point during the iterative process. As shown in FIG. 3, each entry of the nearest neighbor table identifies a given cluster vector or sample vector, its nearest neighbor cluster vector or sample vector, and its proximity (represented, for example, by the calculated correlation value) relative to that nearest neighbor.

FIG. 4 diagrammatically illustrates an apparatus for performing hierarchical clustering analysis with respect to a data set according to exemplary embodiments of the present work. In various embodiments, the apparatus of FIG. 4 is capable of executing various operations illustrated in FIG. 2 in various combinations and sequences. A collection of raw data is noise filtered using PCA techniques at 41, and a resulting noise filtered data set (e.g., the aforementioned matrix $\hat{X}$) is input to a data manager 42 coupled to the PCA filter 41. The data manager 42 stores the noise filtered data in a suitable data storage facility (not explicitly shown).

A data processor 43 is coupled to the data manager 42. In some embodiments, the data processor 43 and the data manager 42 form a data processing apparatus that executes the operations illustrated at 21-29 of FIG. 2. The data processor 43 is configured to compute the aforementioned correlation values, mean values and standard deviation values. The data processor 43 is also configured to determine nearest neighbors and most similar cluster pairs as described above, and to implement the above-described cluster merging operations. The data manager 42 manages data structures that respectively implement the nearest neighbor table and the dendrogram (cluster tree). The data manager 42 is responsive to results provided by the data processor 43 to populate and iteratively update the nearest neighbor table, and to populate the dendrogram.

In some embodiments the raw data is passed directly to the data manager 42 without applying PCA noise filtering at 41, so the nearest neighbor matrix is populated and iteratively updated based on the aforementioned raw data matrix X, instead of the noise-filtered data matrix $\hat{X}$. This is shown in FIG. 4 by the dotted line connection of raw data to the data manager 42.

In various embodiments, the data processor 43 realizes the functionalities described above using various combinations of computer hardware and software that executes on the hardware. Similarly, in various embodiments, the data manager 42 realizes the functionalities described above using various combinations of computer hardware and software that executes on the hardware. In some embodiments, the software for execution on the data manager 42 and/or the data processor 43 is provided in a suitable computer readable storage medium such as shown generally at 44 in FIG. 4. In some embodiments, the data manager 42 and its functionality are provided within the data processor 43.

In applications that apply hierarchical clustering to the analysis of images, some embodiments implement a spatial continuity constraint. Hierarchical clustering with the spatial continuity constraint operates similarly to conventional hierarchical clustering except, in the process of calculating the nearest neighbor and associated proximity metric (e.g., Euclidean distance or correlation) for a given pixel of interest (e.g., in the initial step of generating the nearest neighbor matrix), the spatial continuity constraint restricts the nearest neighbor search to neighboring pixels that are spatially contiguous to the pixel of interest.

Figure 5:
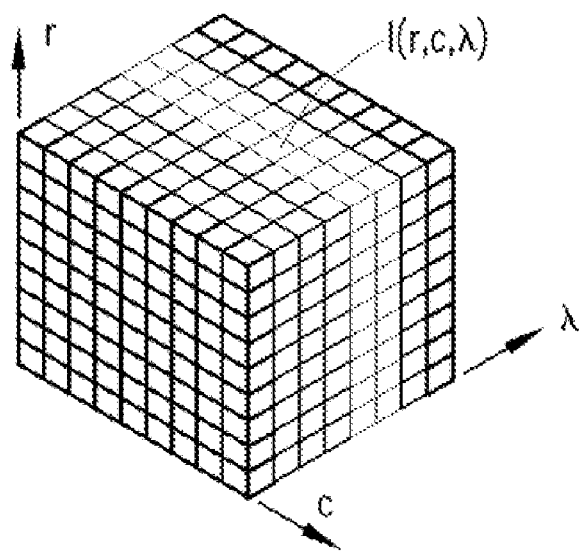
FIG. 5 graphically illustrates a spectral image data set to which techniques according to the present work may be applied.

For example, consider an image composed of pixels arranged in an array of a spatial rows, and b spatial columns. In a multivariate image, each pixel has two or more associated variables (which may represent, for example, respective spectral channels as described above). These variables correspond to the values of the sample vectors described above, so that each pixel is a pixel vector. For a univariate image, each pixel has a single associated image variable. FIG. 5 depicts a pixel vector array for a multivariate image. The array has nine rows (a=9), nine columns (b=9), and eight variables. The eight image variables associated with each pixel vector correspond to the values of the sample vectors described above (i.e., sample vectors having n=8). This example multivariate image is thus composed of a 9×9 array of 8-dimensional pixel vectors, with each pixel vector having eight data values from an image variable space. Each particular data value is a function $l(r,c,\lambda)$ as shown, where r is the spatial row index (corresponding to a), c is the spatial column index (corresponding to b), and $\lambda$ is the index for the data values of the pixel vectors.

Figure 6:
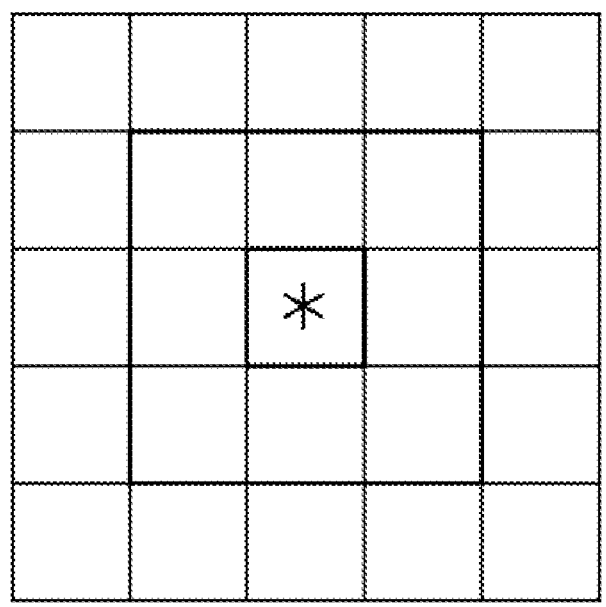
FIG. 6 graphically illustrates application of a spatial continuity constraint to a set of pixel vectors according to exemplary embodiments of the present work.

FIG. 6 shows an example where a=b=5, defining a 5×5 portion of an array of pixel vectors. For this example, the spatial continuity constraint restricts the nearest neighbor search to the eight neighboring pixel vectors that are spatially contiguous to the pixel vector of interest. In FIG. 6, the pixel vector of interest is designated with an asterisk (*), and its eight neighboring pixels are shaded. Similarly, as the individual pixels are merged into clusters during the iterative clustering process, the nearest neighbor search for a given cluster of interest is restricted to clusters that are adjacent to (i.e., border spatially) the cluster of interest. The spatial continuity constraint is advantageous in EBSD applications, inasmuch as it is consistent with the expectation that the grains within a material should be spatially contiguous.

The processes explained above are described in terms of computer software and hardware. The techniques described may be implemented using machine-executable instructions embodied within a machine (e.g., computer) readable storage medium. The instructions, when executed by a machine, will cause the machine to perform the operations described. Additionally, the processes may be embodied within hardware, such as an application specific integrated circuit ("ASIC") or the like.

A computer-readable storage medium includes any mechanism that provides (e.g., stores) information in a form accessible by a machine (e.g., a computer, network device, personal digital assistant, manufacturing tool, any device with a set of one or more data processors, etc.). In various embodiments, a computer-readable storage medium includes recordable/non-recordable media such as read only memory (ROM), random access memory (RAM), magnetic disk storage media, optical storage media, flash memory devices, etc.

Although exemplary embodiments of the present work are described above in detail, this does not limit the scope of the present work, which can be practiced in a variety of embodiments.

What is claimed is:

1. A computer-implemented method for processing a data set composed of a plurality of data vectors that each includes a plurality of data values respectively associated with a plurality of variables in a variable space, comprising:
   Populating a first data structure with a plurality of entries that correspond to respective ones of said data vectors; and
   iteratively repeating operations of:
      performing correlation calculations to determine for every pair of entries in said first data structure a correlation value indicative of a correlation between the associated pair of data vectors,
      using the correlation values to identify one said pair of entries that has an associated pair of data vectors are closer to one another in the variable space than any other pair of data vectors associated with any other pair of entries,
      recording the identified pair of entries in a second data structure,
      merging the pair of data vectors associated with the identified pair of entries to define a merged data vector, and
      replacing the identified pair of entries in the first data structure with an entry corresponding to the merged data vector.

2. The method of claim 1, wherein said performing correlation calculations includes calculating for each said data vector of each said pair a mean value and a standard deviation value associated with the data values of said data vector.

3. The method of claim 1, wherein said data set includes electron backscattered diffraction (EBSD) data.

4. A computer-readable storage medium which provides instructions that, when executes by a machine, cause the machine to perform operations to process a data set composed of a plurality of data vectors that each includes a plurality of data values respectively associated with a plurality of variables in a variable space, said operations comprising:
   Populating a first data structure with a plurality of entries that correspond to respective ones of said data vectors; and
   iteratively repeating operations of:
      performing correlation calculations to determine for every pair of entries in said first data structure a correlation value indicative of a correlation between the associated pair of data vectors,
      using the correlation values to identify one said pair of entries that has an associated pair of data vectors are closer to one another in the variable space than any other pair of data vectors associated with any other pair of entries,
      recording the identified pair of entries in a second data structure,
      merging the pair of data vectors associated with the identified pair of entries to define a merged data vector, and
      replacing the identified pair of entries in the first data structure with an entry corresponding to the merged data vector.

5. The storage medium of claim 4, wherein said performing correlation calculations includes calculating for each said data vector of each said pair a mean value and a standard deviation value associated with the data values of said data vector.

6. An apparatus for processing a data set composed of a plurality of data vectors that each includes a plurality of data values respectively associated with a plurality of variables in a variable space, comprising:
   An input for receiving said plurality of data vectors; and
   A data processing apparatus coupled to said input, said data processing apparatus configured to
   Populating a first data structure with a plurality of entries that correspond to respective ones of said data vectors; and
   iteratively repeating operations of:
      performing correlation calculations to determine for every pair of entries in said first data structure a correlation value indicative of a correlation between the associated pair of data vectors,
      using the correlation values to identify one said pair of entries that has an associated pair of data vectors are closer to one another in the variable space than any other pair of data vectors associated with any other pair of entries,
      recording the identified pair of entries in a second data structure,
      merging the pair of data vectors associated with the identified pair of entries to define a merged data vector, and
      replacing the identified pair of entries in the first data structure with an entry corresponding to the merged data vector.

7. The apparatus of claim 1, wherein said performing correlation calculations includes calculating for each said data vector of each said pair a mean value and a standard deviation value associated with the data values of said data vector.

8. A computer-implemented method for processing an image represented by an array of pixel vectors that each represents a respective spatial portion of the image and includes a plurality of data values respectively associated with a plurality of variables in an image variable space, comprising:
   populating a first data structure with a plurality of entries that correspond to respective to respective ones of said pixel vectors; and
   iteratively performing operations of:
      for each entry in the first data structure, using a proximity metric to associate the entry with another entry and thereby identify a pair of entries, wherein said another entry is selected from a subset of entries that has an respectively associated pixel vectors represent spatial portions of the image that respectively border a spatial portion of the image represented by the pixel vector associated with the entry, and wherein the pixel vector associated with said another entry is, among the pixel vectors associated with the subset of entries, closest in the image variable space to the pixel vector associated with the entry, using the proximity metric to identify one said pair of entries whose associated pair of pixel vectors are closer to one another in the image variable space than any other pair of pixel vectors associated with any other pair of entries, recording the identified pair of entries in a second data structure, merging the pair of pixel vectors associated with the identified pair of entries to define a merged pixel vector that represents a spatial portion of the image jointly represented by the pair of pixel vectors associated with the identified pair of entries, and replacing the identified pair of entries in the first data structure with an entry corresponding to the merged pixel vector.

9. The method of claim 8, wherein said using a proximity metric to associate the entry with another entry and thereby identify a pair of entries includes performing a correlation calculation to determine for the pair of entries a correlation value indicative of a correlation between the associated pair of pixel vectors.

10. The method of claim 9, wherein said performing a correlation calculation includes calculating for each of said associated pair of pixel vectors a mean value and a standard deviation value associated with the data values of said pixel vector.

11. The method of claim 8, wherein the image is an image of an electron backscattered diffraction (EBSD) pattern.

12. A computer-readable storage medium which provides instructions that, when executes by a machine, cause the machine to perform operations to process an image represented by an array of pixel vectors that each represents a respective spatial portion of the image and includes a plurality of data values respectively associated with a plurality of variables in an image variable space, said operations comprising:

populating a first data structure with a plurality of entries that correspond to respective to respective ones of said pixel vectors; and iteratively performing operations of:
for each entry in the first data structure, using a proximity metric to associate the entry with another entry and thereby identify a pair of entries, wherein said another entry is selected from a subset of entries that has an respectively associated pixel vectors represent spatial portions of the image that respectively border a spatial portion of the image represented by the pixel vector associated with the entry, and wherein the pixel vector associated with said another entry is, among the pixel vectors associated with the subset of entries, closest in the image variable space to the pixel vector associated with the entry, using the proximity metric to identify one said pair of entries whose associated pair of pixel vectors are closer to one another in the image variable space than any other pair of pixel vectors associated with any other pair of entries, recording the identified pair of entries in a second data structure, merging the pair of pixel vectors associated with the identified pair of entries to define a merged pixel vector that represents a spatial portion of the image jointly represented by the pair of pixel vectors associated with the identified pair of entries, and replacing the identified pair of entries in the first data structure with an entry corresponding to the merged pixel vector.

13. The storage medium of claim 12, wherein said using a proximity metric to associate the entry with another entry and thereby identify a pair of entries includes performing a correlation calculation to determine for the pair of entries a correlation value indicative of a correlation between the associated pair of pixel vectors.

14. The storage medium of claim 13, wherein said performing a correlation calculation includes calculating for each of said associated pair of pixel vectors a mean value and a standard deviation value associated with the data values of said pixel vector.

15. An apparatus for processing an image represented by an array of pixel vectors that each represents a respective spatial portion of the image and includes a plurality of data values respectively associated with a plurality of variables in an image variable space, comprising:

populating a first data structure with a plurality of entries that correspond to respective to respective ones of said pixel vectors; and iteratively performing operations of:
for each entry in the first data structure, using a proximity metric to associate the entry with another entry and thereby identify a pair of entries, wherein said another entry is selected from a subset of entries that has an respectively associated pixel vectors represent spatial portions of the image that respectively border a spatial portion of the image represented by the pixel vector associated with the entry, and wherein the pixel vector associated with said another entry is, among the pixel vectors associated with the subset of entries, closest in the image variable space to the pixel vector associated with the entry, using the proximity metric to identify one said pair of entries whose associated pair of pixel vectors are closer to one another in the image variable space than any other pair of pixel vectors associated with any other pair of entries, recording the identified pair of entries in a second data structure, merging the pair of pixel vectors associated with the identified pair of entries to define a merged pixel vector that represents a spatial portion of the image jointly represented by the pair of pixel vectors associated with the identified pair of entries, and replacing the identified pair of entries in the first data structure with an entry corresponding to the merged pixel vector.

16. The apparatus of claim 15, wherein said using a proximity metric to associate the entry with another entry and thereby identify a pair of entries includes performing a correlation calculation to determine for the pair of entries a correlation value indicative of a correlation between the associated pair of pixel vectors.

17. The apparatus of claim 16, wherein said performing a correlation calculation includes calculating for each of said associated pair of pixel vectors a mean value and a standard deviation value associated with the data values of said pixel vector.

* * * * *